W. AMES.
INDICATING CALIPERS.
APPLICATION FILED OCT. 23, 1916.
1,259,196.
Patented Mar. 12, 1918.
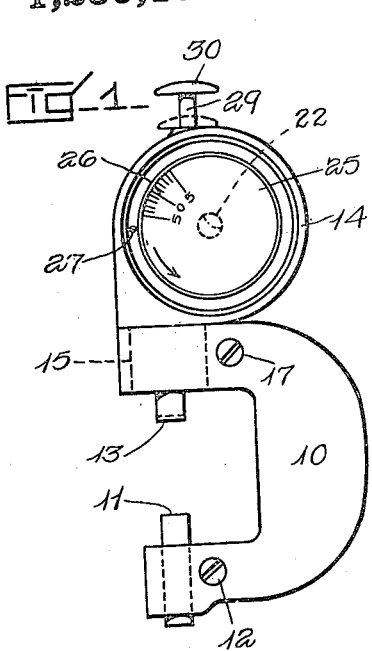
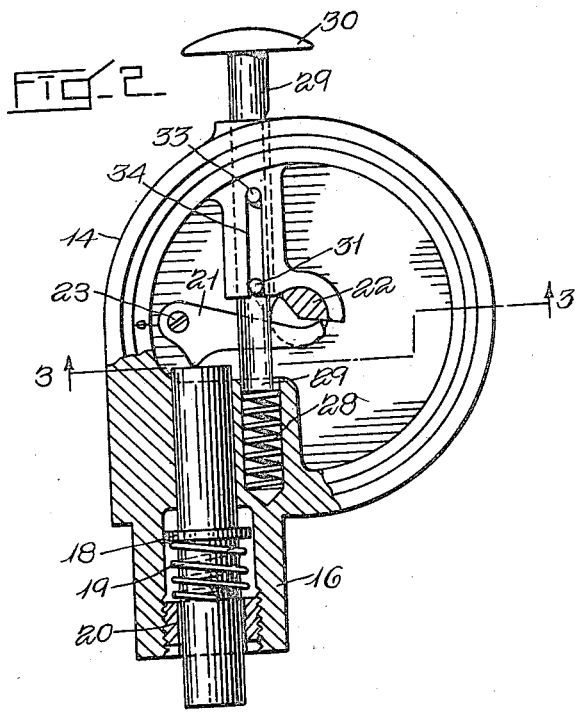
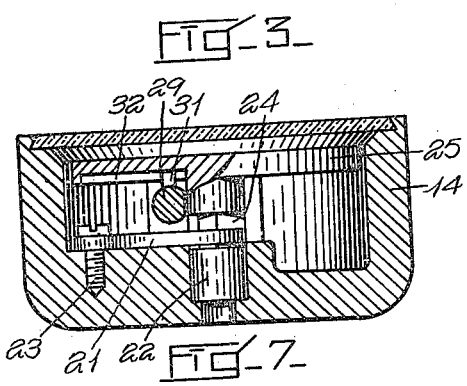
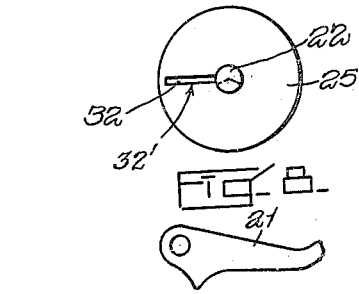
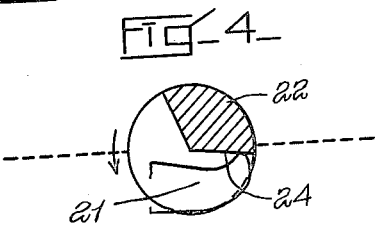
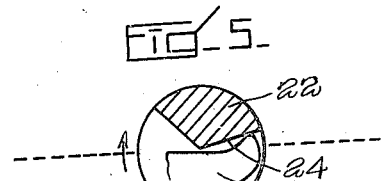
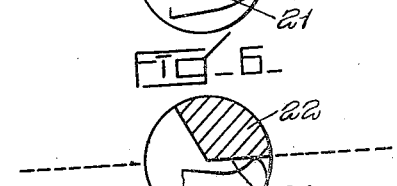
INVENTOR=
WARREN AMES
by *[signature]*
ATTORNEYS

UNITED STATES PATENT OFFICE.

WARREN AMES, OF WALTHAM, MASSACHUSETTS.

INDICATING-CALIPERS.

1,259,196.　　　　Specification of Letters Patent.　　Patented Mar. 12, 1918.

Application filed October 23, 1916. Serial No. 127,080.

*To all whom it may concern:*

Be it known that I, WARREN AMES, a citizen of the United States, residing at Waltham, in the county of Middlesex and State of Massachusetts, have invented new and useful Improvements in Indicating-Calipers, of which the following is a specification.

This invention relates to calipers, and its object is to provide an instrument that can be quickly applied to and removed from the object to be measured, and that will indicate the measurement. The invention is particularly adapted to be embodied in an instrument for measuring successively a plurality of objects of approximately the same size,— as, for example, duplicate parts of which the range of variation permissible is limited to a few thousandths of an inch.

One of the indicating elements is provided with a scale of indicating marks arranged to show whether the measurement of the object is more or less than a predetermined standard measurement, and to indicate to what degree the actual measurement is more or less than the standard. The movable indicating element takes its indicating position automatically from the object being measured, no manipulation being required other than to retract one of the contact members from the other to permit the object to be interposed between them. The movement of the indicator to indicating position is caused by a spring, and the movable elements are so proportioned and arranged that the indicating element may have a relatively great movement in consequence of a relatively minute movement of the movable contact member.

If on applying the caliper to an object it is found that the latter is over size, the indicator will shown the degree of excess measurement, and it can therefore be estimated approximately how much grinding, planing, turning, filing or other working of the object is required to reduce it to the standard size without having to guess how much stock would have to be removed.

Of the accompanying drawings, which illustrate one form in which the invention may be embodied:

Figure 1 represents an elevation of the instrument.

Fig. 2 represents an elevation, partly in section, of the operating mechanism on a larger scale, the parts being shown in normal or initial position.

Fig. 3 represents a section through the structure intersected by line 3—3 of Fig. 2.

Figs. 4, 5 and 6 represent respectively the initial position, the extreme opposite position, and an intermediate position, of the oscillatory indicating element and the lever that transmits motion therefrom to the movable contacting member.

Fig. 7 represents an inverted plan view of the oscillatory indicating element.

Fig. 8 represents an elevation of the lever that coacts with the indicating element.

The same reference characters indicate the same parts wherever they occur.

The main frame of the caliper is indicated at 10. It has a fixed contact element 11 which, as is usual in micrometer calipers, is adjustable for the purpose of compensating for wear and which is secured in place by a pinching screw 12. The movable contact member is indicated at 13, and for the purposes of the present invention it has a very limited range of movement, which is represented by the space between the horizontal bottom line and the horizontal dotted line at the lower end of such member in Fig. 1.

The movable contact member is arranged to slide in a casing 14. This casing is detachable from the frame 10 and is adapted to be turned relatively to said frame to any desired angle. The frame 10 is formed with a cylindric socket 15 in which a stud portion 16 of the casing 14 is fitted. The socket portion of the frame 10 is adapted to be compressed by a pinching screw 17 to secure the casing 14.

The movable contact member 13 is provided with a collar 18 which serves as an abutment for a helical compression spring 19. The latter is compressed against the collar 18 by an annular screw-plug 20 that has screw-threaded connection with the internal surface of the stud portion 16. The spring 19 tends to retract the member 13 from the contact element 11, but the stress of the spring is sustained by a lever 21, and in turn by the stem or arbor 22 of the movable indicating element. The fulcrum of lever 21 is indicated at 23. As shown by Fig. 3, the arbor 22 is cut away to form a notch into which the outer end of lever 21 extends, and to provide a face 24 against which the lever may bear. The arbor 22 carries the movable indicating member 25 which, in the present instance, is a circular disk. As shown by Fig. 1, disk 25 is provided with a scale of marks indicated collectively at 26. The middle mark of such scale may be regarded as the standard of accuracy when it registers with a coöperative mark, such as 27, on the casing 14. The scale 26 may have as great a range as desired, but for some purposes it is sufficient to carry it only far enough to show from one to five thousandths of an inch over the standard measurement and to show from one to five thousandths of an inch under the standard measurement. In the present instance each mark of the scale represents one thousandth of an inch.

The indicating element is provided with a spring that is arranged to counteract the spring 19, and the counteractive force is of greater degree as applied to the movable contact member 13, and therefore keeps the latter normally toward the element 11, notwithstanding the constant tendency on the part of spring 19 to retract member 13 from the element. This combination of opposed spring forces eliminates lost motion between the movable parts and insures the utmost accuracy in the reading or indication afforded by the disk 25. It is immaterial, so far as the fundamental principle is concerned, in what form the counteracting spring is made, and in what position it is arranged; but for convenience I provide a helical compression spring 28 and arrange it to act upon a plunger 29 instead of arranging it to act directly upon the indicating element. The plunger 29 is provided with a head 30 by which it may be depressed against the stress of spring 28. A pin 31 carried by plunger 29 extends into a groove 32 formed in the under side of disk 25. A second pin 33 carried by plunger 29 is arranged to move in a slot 34 to prevent rotative movement of the plunger, so that the pin 31 cannot be displaced from the groove 32. By depressing plunger 29 the indicating element is turned so as to enable spring 19 to retract the movable contact member 13 to admit the object to be measured.

The caliper operates as follows. Assuming that the member 13, disk 25, and plunger 29 are in their normal or initial positions, as shown by Figs. 1 and 2,—the member 13 may be retracted from the element 11 by depressing the head 30 to the position indicated by dotted lines in Fig. 1. Downward movement of plunger 29 is transmitted by pin 31 to disk 25, and the latter is turned in the direction indicated by the arrow in Fig. 1 and by the arrow in Fig. 4. The scale 26 is thus carried below the indicating mark 27, and the face 24 of the arbor 22 is moved from the angular position shown by Fig. 4 to that shown by Fig. 5. Lever 21 and contact member 13 are therefore permitted to move in response to the stress of spring 19, and the two coöperative calipering elements are thus separated to receive the object to be measured. As soon as the object has been interposed plunger 29 may be released, and the following movements occur. Spring 28 reacts; forcing plunger 29 upwardly. Pin 31, acting against face 32' (Fig. 7), turns disk 25 in the opposite direction, as indicated by the arrow in Fig. 5. Face 24 of arbor 22 depresses the free end of lever 21, and the lever reacts upon contact member 13 to depress the latter as far as the object will permit. Assuming that the size of the object is correct according to a predetermined standard, and assuming that the fixed contact element 11 has been adjusted accurately according to such standard, the reactionary movement of the indicating element will be arrested when the zero mark of the scale 26 is in registration with the mark 27, at which point the face 24 of arbor 22 will occupy the position shown by Fig. 6. If the object being measured is under size or over size, the movable indicating element will show to what degree the variation exists.

An instrument embodying the structure shown will not be affected as to accuracy by having oil on its movable parts or by being wet with water. In fact, the instrument may be filled with oil or water without losing its accuracy to any appreciable extent. Spring 28 takes up all lost motion between the indicating element and movable contact member 13 when the latter is brought to bear against the object being measured, and a correct indication is thus assured. Inasmuch as the lever is the only element required to transmit motion from the indicating member to the element 13, and vice versa, the instrument is not likely to get out of order nor likely to wear out to a degree that would affect its accuracy.

I claim:

1. An indicating caliper comprising a frame having a fixed contact element, a movable contact member arranged to coact with said fixed contact element to caliper an object interposed between them, a spring arranged to retract said movable member from said fixed contact element, a lever arranged to bear against said movable contact member to sustain the stress of said spring, a movable indicating element having a face arranged to bear against said lever to sustain the stress of said spring as transmitted by said lever, said face and lever being arranged to cause a relatively minute movement of said movable contact member in consequence of relatively great indicating movement of said indicating element, and a spring arranged to act on said lever through the medium of said indicating element to counteract the effect of the first said spring upon said movable contact member.

2. An indicating caliper comprising a frame having a fixed contact element, a movable contact member arranged to coact with said fixed contact element to caliper an object interposed between them, a spring arranged to retract said movable member from said fixed element, a lever arranged to bear against said movable member to sustain the stress of said spring, an oscillatory indicating element having an axial stud portion, said portion having a face arranged to bear against said lever to sustain the stress of said spring as transmitted by said lever, said face and lever being arranged to cause a relatively minute movement of said movable contact member in consequence of relatively great indicating movement of said indicating element, an operating member, means arranged to transmit movement from said operating member to said indicating element, and a spring arranged to act on said operating member to move said movable contact member toward said fixed contact element, against the stress of the first said spring.

3. An indicating caliper comprising a frame having a fixed contact element, a movable contact member arranged to coact with said fixed contact element to caliper an object interposed between them, a spring arranged to retract said movable member from said fixed element, a lever arranged to bear against said movable member to sustain the stress of said spring, an oscillatory indicating element having an axial stud portion, said portion having a face arranged to bear against said lever to sustain the stress of said spring as transmitted by said lever, said face and lever being arranged to cause a relatively minute movement of said movable contact member in consequence of relatively great indicating movement of said indicating element, an operating member, said operating member and said indicating element having pin-and-groove connection arranged to transmit motion from one to the other and vice versa, and a spring arranged to act on said operating member to move said movable contact member toward said fixed contact element, against the stress of the first said spring.

4. An indicating caliper comprising a frame having a fixed contact element, a movable contact member arranged to coact with said fixed contact element to caliper an object interposed between them, a movable indicating element, motion-reducing means arranged to transmit movement from said indicating element to said movable contact member to move the latter toward said fixed contact element, a spring arranged to cause such movement of said movable contact member through the medium of said indicating element, and a spring arranged to retract said movable contact member from said fixed contact element when said motion-reducing means is moved to permit such retraction.

5. An indicating caliper comprising a frame having a fixed contact element, a movable contact member arranged to coact with said fixed contact element to caliper an object interposed between them, a movable indicating element, a motion-reducing lever having limited point contact with said indicating element and with said movable contact member to transmit movement in one direction from said indicating element to said contact member to move the latter toward said fixed contact element, a spring arranged to move said movable contact member toward said fixed contact element through the medium of said indicating element, and a spring arranged to retract said movable contact member from said fixed contact element when said indicating element is moved in opposition to the stress of the first said spring.

6. An indicating caliper comprising a frame having a fixed contact element, and a train of mechanism including a spring, a movable contact member, a multiplying lever, a movable indicating member, a manually operative member, and a second spring, all arranged to bear one upon another in the order recited, the first said spring being arranged to retract said movable contact member from said fixed contact element, said second spring being arranged to counteract and dominate the first said spring, and said manually operative member being arranged to move said indicating element so as to enable the first said spring to retract said movable contact member from said fixed contact element.

In testimony whereof I have affixed my signature.

WARREN AMES.

Copies of this patent may be obtained for five cents each, by addressing the "Commissioner of Patents, Washington, D. C."